(12) United States Patent  (10) Patent No.: US 7,264,119 B2
Navickas  (45) Date of Patent: Sep. 4, 2007

(54) CHAINED POUCHES SYSTEM AND METHOD

(76) Inventor: Jonas A. Navickas, 53-628 KamehaMeha Hwy., Hau'ula, HI (US) 96717

( * ) Notice: Subject to any disclaimer, the term of this patent is extended or adjusted under 35 U.S.C. 154(b) by 0 days.

(21) Appl. No.: 10/673,113

(22) Filed: Sep. 25, 2003

(65) Prior Publication Data

US 2004/0134825 A1    Jul. 15, 2004

Related U.S. Application Data

(60) Provisional application No. 60/413,804, filed on Sep. 25, 2002.

(51) Int. Cl.
*B65D 85/00* (2006.01)
*B65D 1/34* (2006.01)

(52) U.S. Cl. .............. 206/390; 206/554; 206/308.1; D6/635; D6/632; D3/270

(58) Field of Classification Search ........... 206/307, 206/308.1, 309–312, 554, 390; 211/40, 41.12; D6/635, 632; D3/270, 301; 383/38
See application file for complete search history.

(56) References Cited

U.S. PATENT DOCUMENTS

| | | | |
|---|---|---|---|
| 877,060 A * | 1/1908 | Douglass ................. 229/72 |
| 1,021,598 A | 3/1912 | Harrington | |
| 2,715,493 A * | 8/1955 | Vogt ........................ 229/69 |
| 3,057,539 A * | 10/1962 | Leary, Jr. ................. 383/206 |
| 4,226,330 A * | 10/1980 | Butler ..................... 383/207 |
| 4,502,596 A * | 3/1985 | Saetre et al. ............. 206/466 |
| 4,730,727 A * | 3/1988 | Petroff .................... 206/311 |
| 4,762,225 A * | 8/1988 | Henkel .................. 206/308.1 |
| 4,860,899 A * | 8/1989 | McKee .................... 206/534 |
| D336,367 S * | 6/1993 | Morton ................... D3/303 |
| 5,291,990 A * | 3/1994 | Sejzer .................... 206/748 |
| 5,682,992 A * | 11/1997 | Hunt et al. ............. 206/309 |
| D401,464 S * | 11/1998 | Cheris et al. ........... D6/634 |
| 5,941,641 A * | 8/1999 | Kinigakis et al. ........ 383/86 |
| 6,186,321 B1 * | 2/2001 | Eskandry ............. 206/308.1 |
| 6,419,082 B1 * | 7/2002 | Frankeny .............. 206/308.1 |

* cited by examiner

*Primary Examiner*—Jila M. Mohandesi

(57) ABSTRACT

A storage system comprising two or more pouches, joined sequentially pouch-lip to pouch-lip by a flexible coupling portion, wherein each coupling portion flexes to permit manipulation of the joined set of pouches, combines advantageous modes of storage, display and access, such as paging, tipping/fan, accordion, parallel, push down, reverse parallel, and pull up modes, with a greatly simplified manufacturing process. The storage system is a very versatile product, suitable for use with a wide variety of inserts, whether planar or non-planar objects, solids or liquids, and for a wide variety of uses to improve identification, retrieval or dispensing of stored inserts.

35 Claims, 9 Drawing Sheets

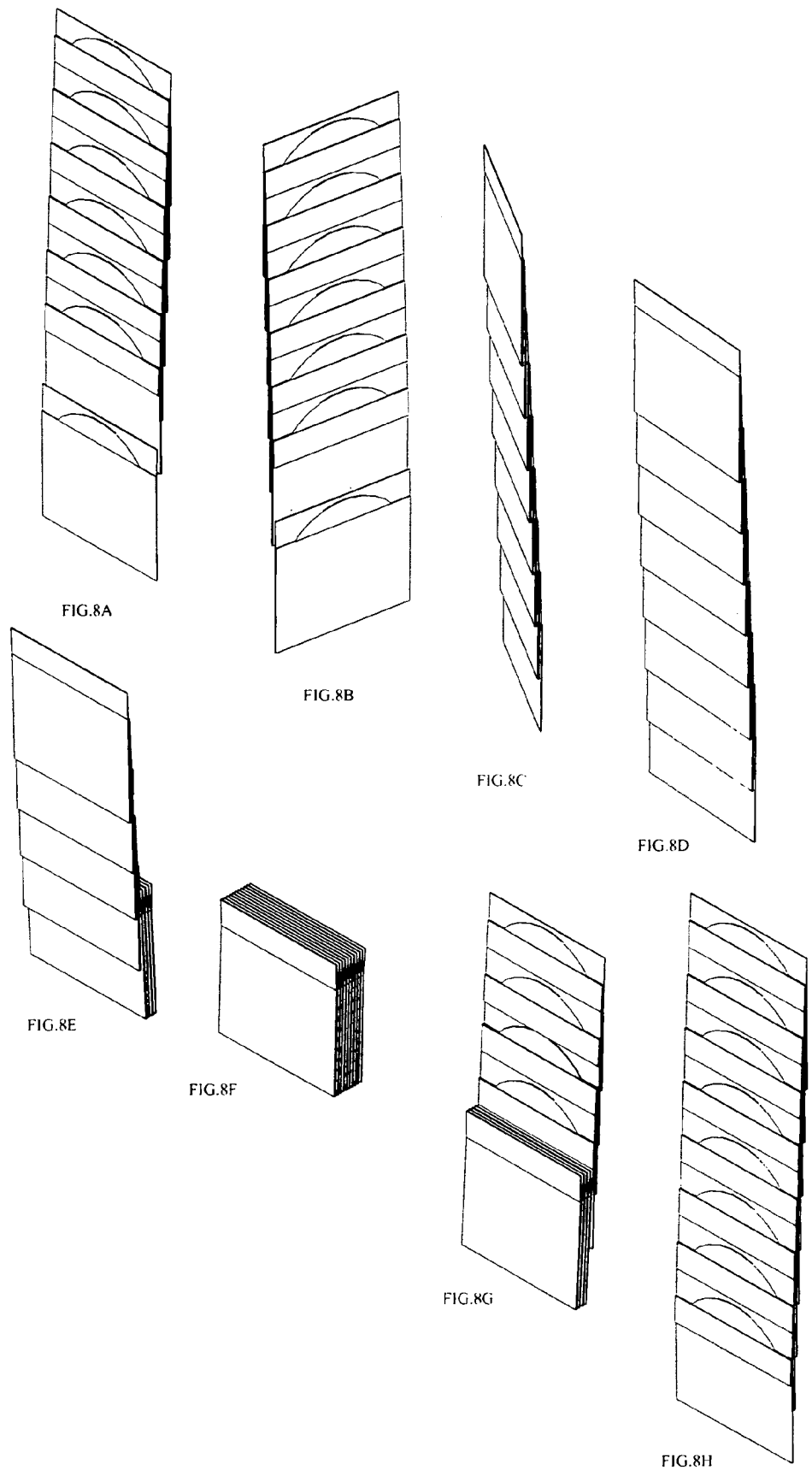

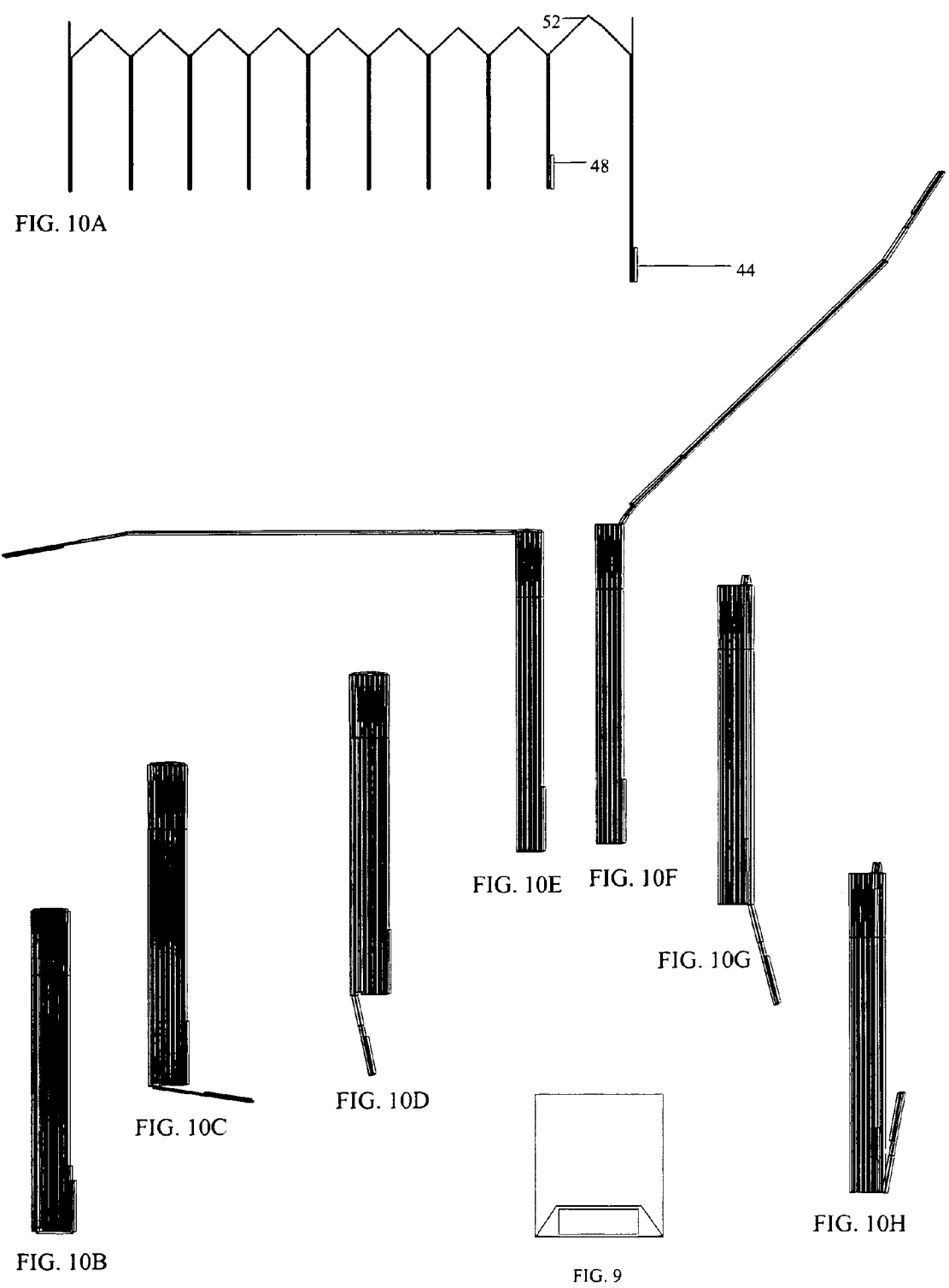

CHAINED POUCHES SYSTEM AND METHOD

RELATED APPLICATION

This application claims the benefit of the provisional patent application, Ser. No. 60/413,804, filed by the same inventor on Sep. 25, 2002, in the U.S. Patent and Trademark Office for an invention entitled "Chained Envelope".

BACKGROUND OF THE INVENTION

1. Field of the Invention

The invention relates to a chain of storage pouches, and more particularly to a combination of two or more pouches joined in a chain in a manner that provides improved human, mechanical, and automated storage and access to pouch labeling and to pouch contents.

2. Description of Related Art

Portfolios, cases, folders, and large envelopes (collectively, "envelopes") are used widely in offices or business operations. Generally, an envelope is made of plastic material and has a rear wall and a front wall; the front and rear walls are often made of transparent material and are connected to each other on or near the edges of three sides thereof, leaving an open, top side between the front plate and the rear plate so as to receive papers, documents, or other contents therein. Envelopes may be manufactured, or assembled by end users, into a linked series of envelopes to provide a particular utility, e.g., to enable easier insertion and retrieval of envelope contents, to reduce misplacement of an envelope, to facilitate identification and retrieval of a particular envelope, etc. The method of linking a series of envelopes typically limits the ways in which the series of envelopes can be manipulated, such as modes of display, of contents insertion, and of retrieval of inserted contents. Manipulation modes are described in detail below. If envelopes are linked to improve identification of one envelope out of a series when the linked envelopes are placed in a drawer or hung as a cascade of envelopes, then other modes of display and use, e.g., fanning, are typically compromised. Similarly, envelopes linked to facilitate handling by humans are often less suited for mechanical or automated handling means. Finally, existing designs for linked envelopes are typically optimized for a given type of envelope contents, e.g., paper documents, discs, or diskettes.

Various functional modes for display and storage of thin, planar articles have been used in prior art inventions. These envelopes may be described as having expandable and/or extendable displays and operate in modes described as accordion-like, fan-like, parallel, and paging modes. Several previous inventions have the ability to display in more than a single mode, for example, a combination of parallel and paging. Structurally, various techniques have been used to achieve these means. All have required a fairly complex manufacturing process to cut components to size, to fold to shape, and to attach pieces to assemble a chained pouches system.

The present invention provides a combination of two or more pouches joined in a chain in a manner that provides improved human, mechanical, or automated access to pouch labeling and to pouch contents. Unlike the related art, the present invention provides in a single storage system paging, tipping/fan, accordion, parallel, push down, reverse parallel, and pull up modes of display and access. The chained pouches of the present invention can be made to accommodate planar contents (e.g., paper documents, discs, and diskettes) or non-planar contents (small parts, small tools, pills, gels, powders, etc.) Moreover, an entire series of chained pouches, optionally including a wrap-around cover, can be manufactured from a single continuous sheet of flexible material. The inventor knows of no related art that provides all of these modes of storage, display and access, the ability to accommodate planar and non-planar contents, and ease of manufacture.

SUMMARY OF THE INVENTION

The invention is a combination of two or more pouches in which the pouches are separate and distinct and are slideably associated in series by a coupling portion of flexible material connecting adjacent pouches. The coupling portion permits the series of pouches to move vertically with respect to each other when the series of pouches is hung, to fan through an arc when the series is placed on a flat surface, and to allow a single pouch (or group of proximate pouches) to be pulled up or pushed down relative to the remaining pouches when the series of pouches is longitudinally compacted. The invention can be manufactured from a single continuous sheet of flexible material, with loops of the flexible material having heat-welded seams applied (or equivalent means of closure being effected) on or near the left, right, and bottom edges of each loop to create a pouch, thereby leaving the top edge of the pouch open and the pouch so formed connected through a coupling portion of flexible material to the adjacent pouches; the first and last pouches in a series are connected only to one adjacent pouch. The first or last pouch can be formed using a longer coupling portion and a flap contiguous with the distal pouch wall of said first or last pouch, which permits wrapping the first or last pouch with flap to enclose the compacted series of pouches and permits fastening of the flap to a fastening means on the most distal wall to secure the enclosure. In the preferred embodiment for planar contents, the pouch and coupling portion are made of a flexible, transparent plastic. Alternative embodiments of the invention can have pouches made of rigid or semi-rigid material suited to the objects to be contained in a pouch. The pouch opening may be partially or completely sealed after the pouch contents are inserted, and the pouch mouth seal may be re-sealable or not. The pouches may be imprinted with text, numeric, and/or graphic information, may have labels affixed, or may be impressed, cut, or otherwise modified to encode information useful in identifying pouch sequence number, contents, and orientation. The material, shape, closures, and perforations of the pouches and/or the material, shape, and perforations of the coupling portions can be modified to facilitate mechanical and automated handling, such as in filling the pouches with contents, sealing the pouches, and retrieving contents from the pouches. Thus, the present invention provides a more versatile storage system than is presently available.

BRIEF DESCRIPTION OF THE DRAWINGS

FIG. 8a illustrates a parallel display mode.

FIG. 8b illustrates a partially rotated suspended parallel display about a vertical axis.

FIG. 8c illustrates a further rotation of the chain about a vertical axis, the rear facing disks coming into view.

FIG. 8d illustrates a completely turned around suspended parallel display, rear view of display.

FIG. 8e illustrates a closing chain in rear view.

FIG. 8f illustrates a closed chain looking at rear top disk.

FIG. 8g illustrates lifting a rear pouch to begin parallel display.

FIG. 8h illustrates a completed parallel display with full access to disks.

FIG. 9 illustrates a rear view of a closed chained pouches system.

FIG. 10a illustrates a cross sectional side view of chained pouches with integral cover.

FIG. 10b illustrates a closed, covered chain.

FIG. 10c illustrates a cover closure unlatched.

FIG. 10d illustrates a flap extended and uncovering bottom of closed chain.

FIG. 10e illustrates a front cover open, exposing first disk in chain.

FIG. 10f illustrates a front cover half open/closed.

FIG. 10g illustrates a front cover in partially open position.

FIG. 10h illustrates a front cover completely open, in display mode.

Figure 1:
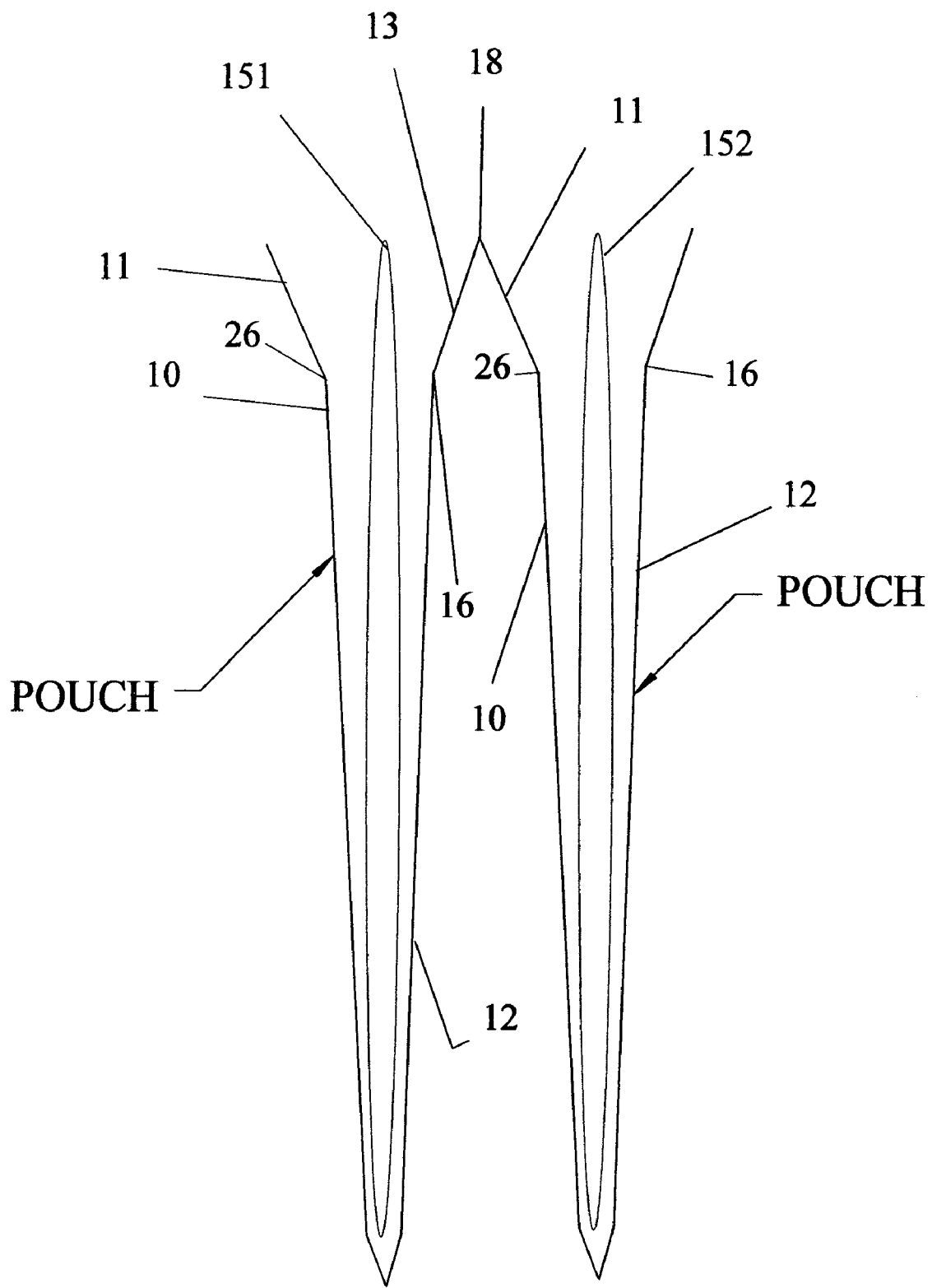
FIG. 1 illustrates the construction of chained pouches, including a cross section showing the coupling portion between pouches.

DRAWING REFERENCE NUMERALS 10 front wall of pouch
11 front wall hinging portion
12 rear wall of pouch
13 rear wall hinging portion
14 side seam
16 hinge (crease) A
18 hinge (crease) B
20=10
22=12
26 hinge (crease) C
30 loop
34 loop seam
40 flap
42 flap hinge
44 flap portion of fastening means
48 pouch portion of fastening means
52 extended pouch wall heights at coupling to cover envelope
60 cover envelope
100 first pouch
151 insert in first pouch
152 insert in second pouch
153 insert in third pouch
200 second pouch
300 third pouch

DETAILED DESCRIPTION OF THE PREFERRED EMBODIMENTS

The chained pouches invention is a combination of two or more pouches in which the pouches are separate and distinct and are slideably associated in series by a coupling portion of flexible material connecting adjacent pouches. A pouch is a receptacle into which one or more objects may be inserted. A pouch is typically closed on three sides, left, bottom, and right, and has one open side, the top or mouth of the pouch; a pouch has a front wall and a rear wall. The closures of the left, bottom, and right sides of a pouch are called "seams". Seams are typically located near the edges of a front or rear wall, to maximize the pouch compartment area; seams may be located away from the wall edges, or one or more additional internal seams may used, to define the pouch compartment to better fit a specific type of contents. As shown in FIG. 1, a front "pouch-lip" 26 is the edge of the top, front wall of a pouch at the topmost point of the side seam. A rear pouch-lip 16 is the edge of the top, rear wall of a pouch at the topmost point of the side seam. The chained pouches invention is, in broadest form, a storage system comprising two or more pouches, joined sequentially rear pouch-lip 26 to front pouch-lip 16 by a flexible coupling portion (11, 13, 18 collectively), wherein each coupling portion flexes to permit manipulation of the joined set of pouches. The manipulations include closing, paging, tipping/fan, accordion, parallel, push down, reverse parallel, and pull up modes of display and access. "Front" and "rear" are from a human user's perspective when holding the chained pouches system in front of the user and using the system.

A "coupling portion" means the span of flexible material extending from a rear pouch-lip of a first pouch to the front pouch-lip of the next pouch in a series of pouches. The junction of a coupling portion and a pouch-lip is called a pouch-lip "hinge". The hinge formed by the coupling portion and the rear wall at the rear pouch-lip is defined as hinge A 16. The hinge formed by the coupling portion and the rear wall at the rear wall is defined as hinge A. Similarly Hinge C 26 is on the front wall. The material between hinges A and C provides a hinging or sliding (if very flexible material) between adjacent pouches. The approximate midpoint of the coupling portion between hinges A and C is defined as the "hinge B" 18 and is parallel to nearest pouch-lips. The hinge B angle is the angle formed by the coupling portion referenced at hinge B. The hinge B angle is "open" where the two arms of the coupling portion are at approximately 180 degrees, "closed" where the two arms of the coupling portion are at approximately 0 degrees, and "half open" where the two arms of the coupling portion are at approximately 90 degrees to one another. The hinge A or C angle is "open" where the proximate wall and the proximate portion of the coupling portion, with the relevant hinge as the vertex of the angle, are at approximately 180 degrees, "closed" where the proximate wall and the proximate portion of the coupling portion are at approximately 0 degrees, and "half open" where the proximate wall and the proximate portion of the coupling portion are at approximately 90 degrees to one another. The different modes of manipulation of chained pouches can be defined by the positional angles of the hinges.

Hinge positions are summarized in the following table.

| Display Mode | Hinge A | Hinge B | Hinge C |
|---|---|---|---|
| Closed | Open | closed | open |
| Paging | Open | closed-open-closed as pages are turned | open |
| tipping/fan | less than half open | open | less than half open |
| Accordion | half open | open | half open |
| Parallel | Closed | open | open |
| push down | Closed | open | open |
| reverse parallel | Open | open | closed |
| pull up | Open | open | closed |

Knowledge of the hinge angles, as observed by a human or by automated means known in the art, is useful in manipulating a pouch, or group of proximate (neighbors in series) pouches, for identification of a pouch or its contents, for inserting an object in a pouch, or for retrieving an object from a pouch. The one or more objects inserted into a pouch are called the "insert". An insert can be of a wide variety of shapes and sizes. For simplicity of description of a preferred embodiment, the insert used herein is a compact disk ("CD").

Figure 3A:
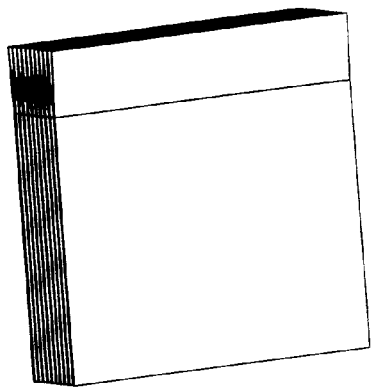
FIG. 3a illustrates a closed chained pouches system.

The display modes are:

Closed (FIG. 3a)

The closed position of the chained pouches system provides for the most compact configuration of the chain. It is the position used for storage of the system. In the closed position hinges A and C are open and hinge B is closed.

Figure 3B:
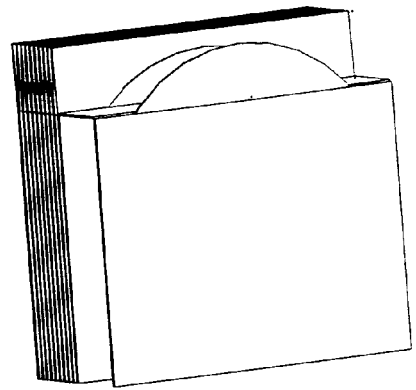
FIG. 3b illustrates a perspective view of single disk accordion display.
Figure 3C:
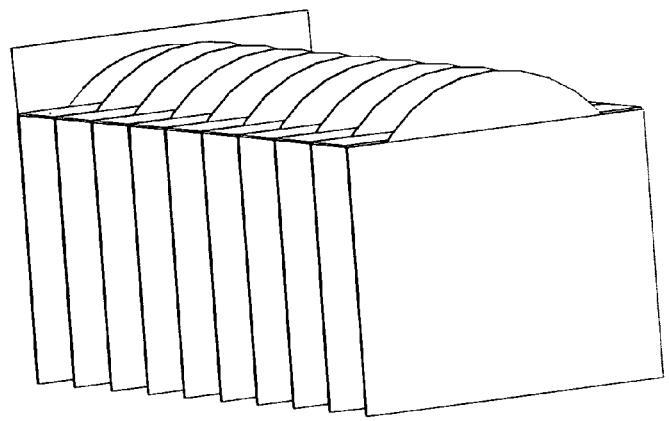
FIG. 3c illustrates a perspective view of accordion display mode.

Accordion (FIGS. 3b and 3c)

If a preceding pouch is pulled forward in a way where the planes of the two separating pouches are maintained in a parallel relationship this is called the accordion display. If an increased displacement of pouches, compared to the other pouches, is between only two pouches, it is the partial accordion display (FIG. 3b). If all or substantial number of the pouches in a chained pouches system are displaced from one another sequentially through the pouches while maintaining the parallel relationship of the successive pouches, it becomes the accordion mode (FIG. 3c). In the accordion mode, Hinges A and C are half open and hinge B is open.

Tipping

Figure 4A:
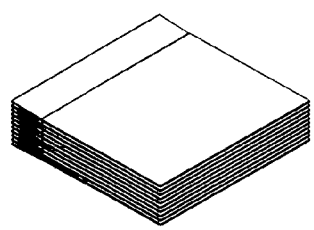
FIG. 4a illustrates a closed chained pouches system.
Figure 4E:
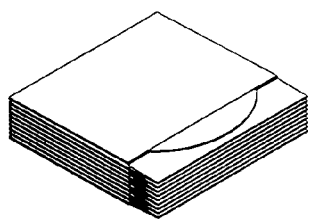
FIG. 4e illustrates a closed chain with reverse side exposed.
Figure 4B:
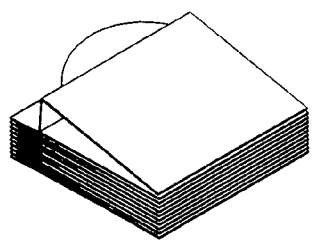
FIG. 4b illustrates a first pouch in the chain in tipping mode display.
Figure 4F:
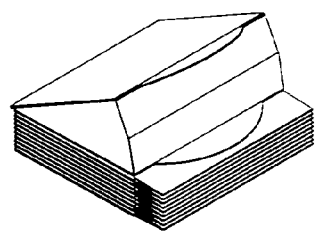
FIG. 4f illustrates a fanning in a reverse direction, visualizing the reverse side of the chain.
Figure 4C:
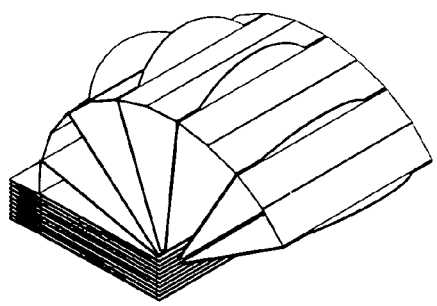
FIG. 4c illustrates continuing tipping by sequential pouches into a fan display.
Figure 4D:
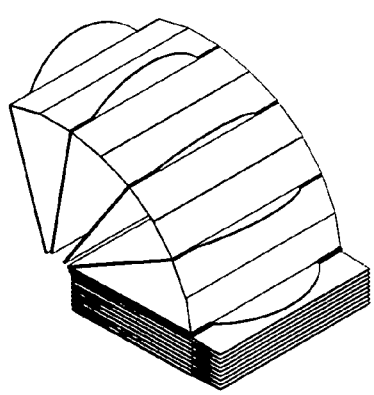
FIG. 4d illustrates a finishing fanning through last disks in chain.

If the preceding pouch is simply allowed to pivot on its lower (bottom) edge while in close approximation to the succeeding pouch, the preceding pouch essentially tips forward. This is called the tipping mode (FIG. 4B).

Fan

Figure 4G:
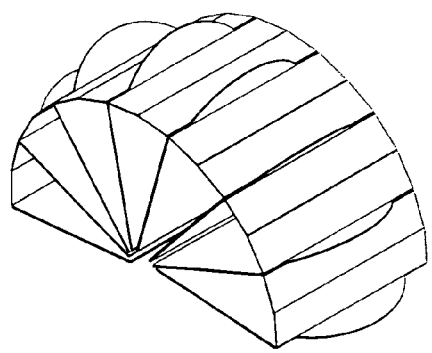
FIG. 4g illustrates a fan display.

If the serial-tipping mode is continued sequentially through the pouches while maintaining the serial-tipping hinge relationship of the hinges between successive pouches, this becomes the fan display mode (FIG. 4G). In the serial tipping mode hinges A and C are somewhat less than half open, and hinge B is open.

Parallel

In the parallel mode, provision is made for adjacent pouches to be displaced in a stepped, partly exposed fashion along the longitudinal axis of a chained pouches system. The angular hinge description for the parallel mode between two pouches in the forward view is hinge A is open, hinge B is open and hinge C is closed. The rear view mode is analogous but the hinge definitions change as the front pouch becomes the rear pouch and the rear pouch becomes the front pouch.

Pull Out/Push Down

Figure 5A:
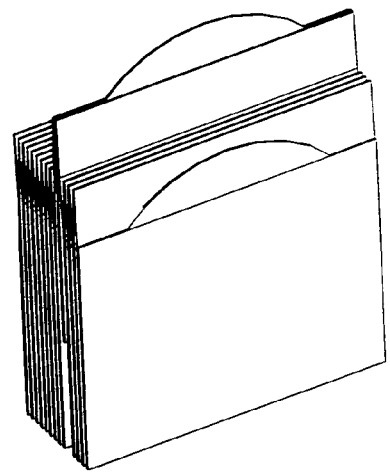
FIG. 5a illustrates a pull up display or single parallel mode.
Figure 5B:
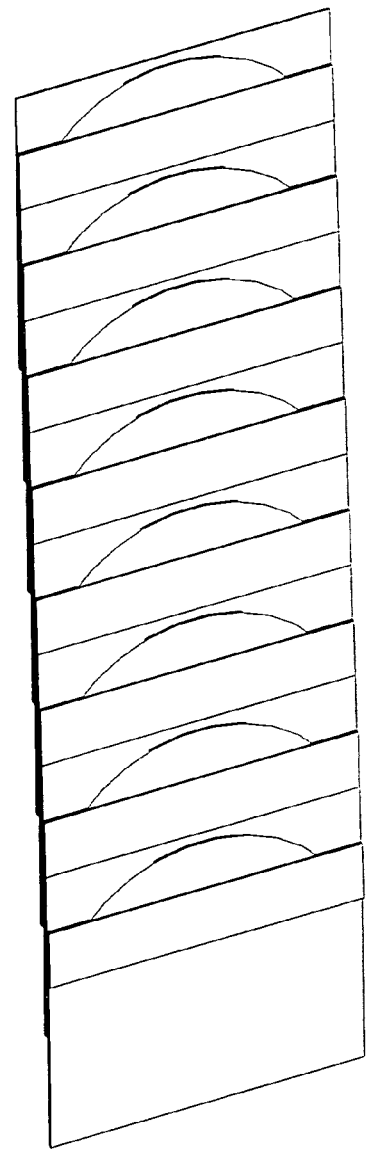
FIG. 5b illustrates a vertically suspended parallel display mode.

The parallel mode can be effected on one (or a group of proximate) pouches in a chained pouches system in two fashions (FIG. 5A). If the pouch (or a group of proximate pouches) is moved up relative to the rest of the chain, it is in the pull up mode. If the pouch (or a group of proximate) is pushed down in relation to the rest of the chain, it is called push down mode. If either of these single pouch parallel modes is continued and the chain is extended sequentially it is called the full parallel (or hanging) mode (FIG. 5B).

Paging

Figure 6A:
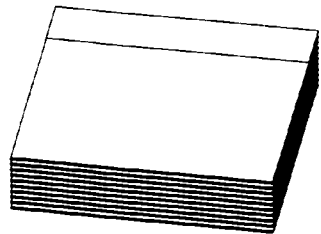
FIG. 6A illustrates beginning vertical paging from a closed position.
Figure 6C:
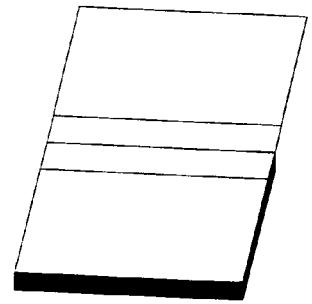
FIG. 6c illustrates a completed vertical page turn.
Figure 6B:
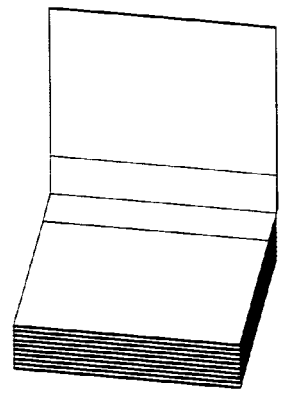
FIG. 6b illustrates a page turned vertically half way.
Figure 6D:
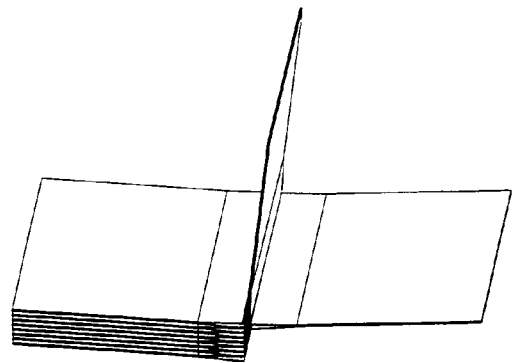
FIG. 6d illustrates a horizontal axis paging, or book paging mode.
Figure 7A:
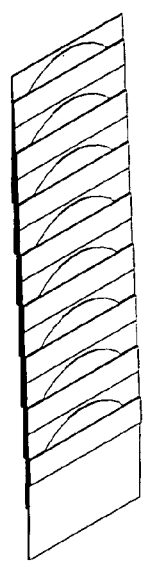
FIG. 7a illustrates a suspended parallel display mode.
Figure 7B:
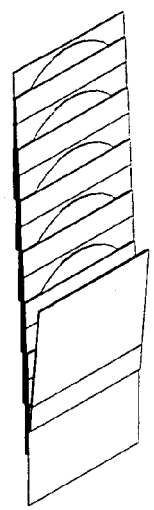
FIG. 7b illustrates a bottom pouch in chain paged vertically.
Figure 7C:
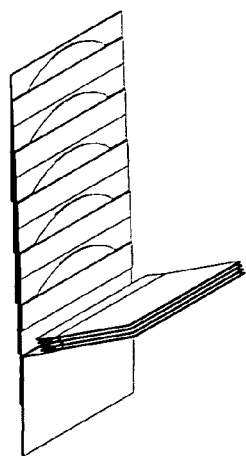
FIG. 7c illustrates a vertically suspended parallel display, bottom 4 disks slid into closed position.
Figure 7D:
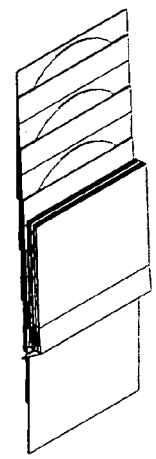
FIG. 7d illustrates a stack of four disks paged vertically while maintaining remainder of display in parallel mode.
Figure 7E:
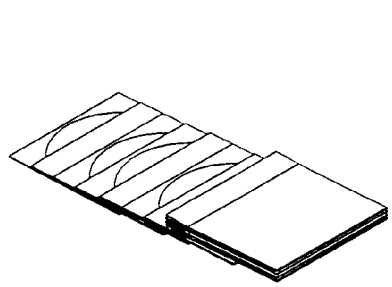
FIG. 7e illustrates a parallel display, laying flat, bottom 4 disks closed.
Figure 7F:
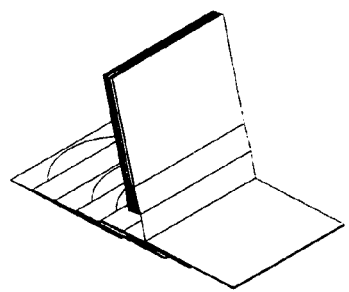
FIG. 7f illustrates a stack of disks paged vertically.

The flexibility and transparency of the coupling portion (when a chained pouches system is made of transparent material) allows the paging display mode (FIG. 6d), in which the chain is paged through as with a book. In this particular mode the disks are not directly accessible, yet can be viewed through a transparent pouch. This is useful for other collectible objects such as comic books, sports cards, photographs and others. Occasionally, users of articles such as compact discs require more printed information about the stored disc than is possible to print on the viewable label of the disc. The structure of the chained pouches system permits the surfaces of the pouches to function as pages in a book or a notepad and maintain orientation on printed or written material for reading and paging. The steps taken by a user in paging are shown in FIGS. 6a to 6c.

Parallel Extended Paging and Sliding Book Paging

The chain can be paged through starting from either the closed mode (FIGS. 6A through C) or a longitudinally expanded position (FIGS. 7A through F), such as full parallel or accordion modes. Paging can occur from the closed position (book paging) or from the extended parallel (extended paging) or using a combination of the closed and book paging modes. (sliding book paging). The paging occurs with hinges A and C in the open position and hinge B moving from the closed to the open position or vice versa. The hinge Bs of pouches proximal to a pouch being extended or slid close slightly (i.e., the proximal pouches move toward a closed mode) to permit the extended or sliding paging of the pouch of interest.

Reversible Display/Double Capacity

The storage capacity of a given set of a chained pouches system can be easily doubled while maintaining all the viewing modes. Two articles, such as compact discs or diskettes, are placed in each pouch of the chain. The articles are oriented so each identifying label is visible when the items are back to back in the pouch. The chain pouches system can be turned around back to front as desired (FIGS. 8a through 8d). The insert labels (or other identification affixed to an insert) of one half of the inserts are accessible for the viewing modes when viewed from the front (FIG. 8a). The insert labels of the second half of the inserts become accessible to the viewing modes when the chain assembly is turned front to back in relation to the viewer (FIG. 8D). When viewed from the back, the disks are identifiable but not accessible. By collapsing to closed position (FIGS. 8D through 8G) then lifting the rearmost pouch (FIG. 8H), the pouch expands to expanded parallel position allowing full display and access to disks in all modes.

Jukebox

The number of pouches in a chained pouches system is limited only by the means of physically handling the system. One means of handling a chained pouches system with scores or hundreds of pouches is to loop the chain back upon itself by affixing the front of the first pouch affixed to the back of the last pouch, creating an endless looping mode. In the top half of the loop, the chain is in the closed position. As the loop is rolled the pouches in the front (turning or reversing portion of the loop closest to the user) fall into a fan mode allowing the identifiers of the inserts to become visible. As the rotation of the loop continues the fan closes back into the closed position in the bottom half of the loop. This closed portion of the chained pouches system continues in an inverted fashion in an opposite direction under the top part of the looped chain. Similarly the chain fans and closes as the chain advances and returns to the top of the loop. A retainer is required under the inverted portion of the chain to keep the articles from falling out of the pouches that are not sealed. The advancement of the chain can be effected through a linkage to a manual or powered mechanism. When the entire loop is used on its side no retaining mechanism is required. This type of endless loop would provide the foundation for a medical records storage and retrieval system which could easily be automated. A scanning means can scan labels or other identification means affixed to each pouch and effect positioning of a pouch of interest for inspection or access to its insert.

Figure 2:
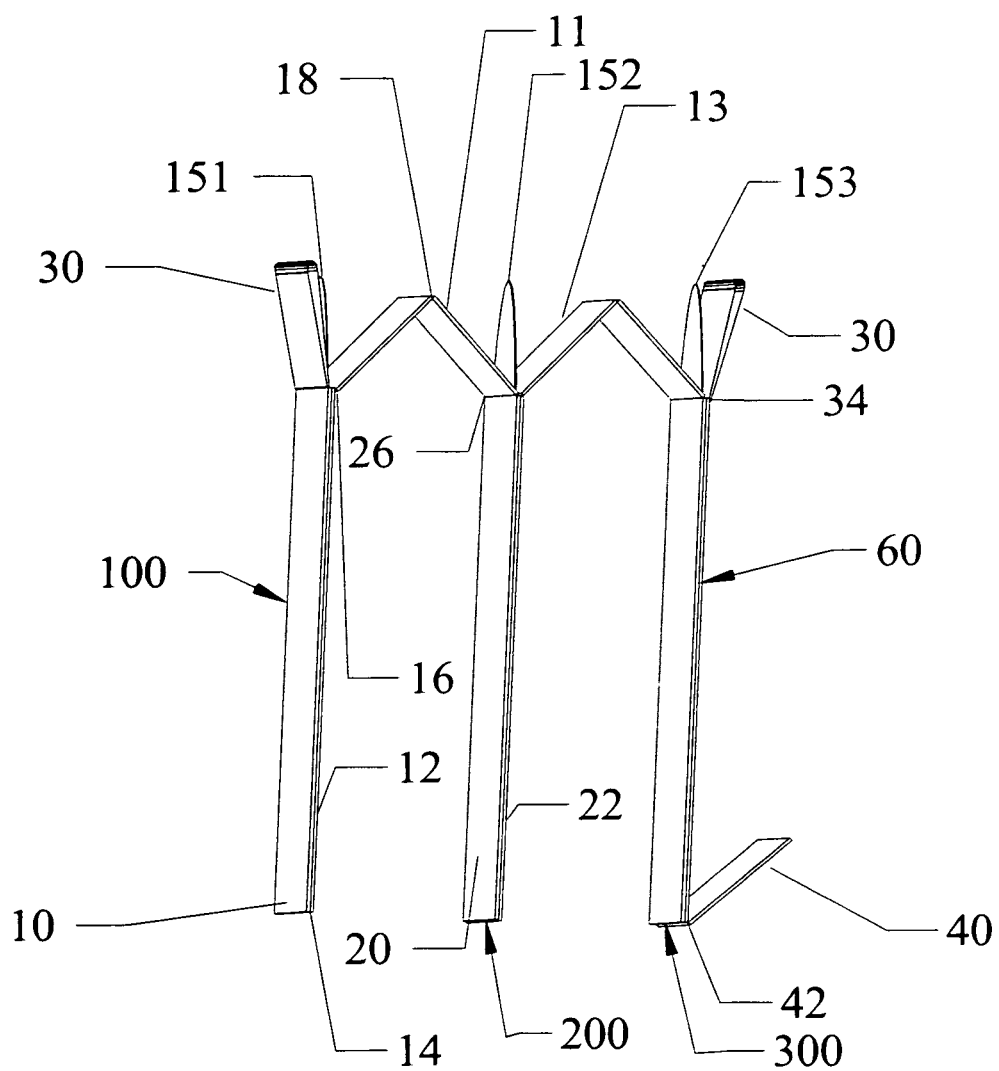
FIG. 2 illustrates a perspective view, showing construction, side seams, hinges, hanging loops and closure flap.

As shown in FIGS. 1 and 2, structurally, pouches 100 and 200 are of sufficient depth to contain an inserted object such as a computer disk 151 and 152, sharing a common top border 181 connecting them, when the pouches are front to back. The side seams 14 of the pouches are not carried to the tops of the pouch. The portions of the pouch walls without side seams 11 and 21 become foldable with hinges 16, 18 and 26 across the faces of the pouches at the level of the upper end of the side seam and at the top edge connecting adjacent pouches. An entire chain of such connected pouches is fabricated from a single piece of stock by folding the material in an accordion like fashion at the bottom and top of each pouch and at the hinges and sealing the sides of the pouches. The chain can be made longer by serially attaching smaller chains or by manufacturing the chain to the desired length and capacity. A cover 60 can be incorporated into the chain by adapting the last pouch to be a cover. This is done by adjusting the folding and seaming process to lengthen the last hinge in the chain and to form an attached flap 40 extending from the bottom of the last pouch in the chain. A fastening means 44 and 48 is affixed to the flap and at the bottom of the second to last pouch in the chain. By pivoting the last pouch forward over the entire closed chain the flap may be wrapped around the bottom of the stack of pouches bringing the fastening means into approximation allowing closure of the cover. As shown in FIG. 9 and FIGS. 10a to 10h, the cover is formed from the last and second last pouches in the chain. Further, a hanging loop (30, in FIG. 2) is incorporated into the chain at the termination of the stock material at either end of the chain. The stock material is folded over on itself and a seam is formed anchoring the termination of the material across the face of the pouch at the level of the tops of the side seams. This forms a loop at either end of a chained pouch. A horizontally mounted rod is inserted through the loop to support the chained pouches system in a hanging parallel display. The capacity of the chained pouches system is easily doubled by incorporating embedded or laminated dividers between the front and rear walls of a pouch and inserting disks on each side of the divider. This protects the fragile surfaces of the disks from scratching each other. A reinforcement along the top exposed edge of the divider can be affixed by heat laminating a narrow strip of plastic film to the border of the exposed portion of the divider.

Alternative embodiments include chained pouches with perforations in one or more coupling portions and/or pouches, or loops or other accessories affixed to one or more coupling portions and/or pouches. In certain instances it may be desirable to provide single or multiple holes at various points in a chained pouches system to allow temporary binding of a chained pouches system. If two holes are provided along the top edge near the corners of the hinges between pouches, the system can be bound through the aligned holes. While bound in this fashion, paging mode is the only available mode. If the holes are along the bottom edges of the pouches, the mode is limited to fan mode. In either of these examples the chained pouches system could easily be removed from the binding, used in all the display modes and easily be interchanged with other chained pouches systems. If a series of single holes is made through a top corner of each hinge and the chained pouches system bound through these aligned holes semi-fanning or semi-paging modes are possible. In these modes the inserts are easily visualized, including fronts and backs of pouches, the items are still easily removable, and the chained pouches system is maintained in a mostly closed, compact storage configuration.

A closed chained pouches system can be stored in a separate cover assembly. Another alternative embodiment is the inclusion of an integral cover in a series of chained envelopes. A folding cover may be affixed to the chained pouches system. Alternately a cover can be fashioned to be integral with the chained pouches system by extending the front or back edge of the chain so that its length is sufficient to partially or completely wrap around the chained pouches system. The loose edge of the cover can easily be affixed using conventional means such as a hook and loop type fastener or semi-permanent adhesive or button. As shown in FIG. 9 and FIGS. 10a to 10h, to make a chained pouches system with an integral cover, a length of the flexible coupling portion joining the penultimate pouch to the ultimate pouch in a chained pouches system is elongated to permit the elongated coupling portion to wrap around the coupling portion side of the compacted chained pouches system and when so wrapped to permit the ultimate pouch to abut the face of the first pouch in the chained pouches system, wherein the ultimate pouch is sized to have a longer length of pouch or flap affixed to the ultimate pouch to permit the longer ultimate length when so wrapped to enclose the bottom of the compacted chained pouches system, and wherein a first fastening means is disposed on or near the end of the longer length to engage a corresponding fastening means positioned on the rear wall of the penultimate pouch, thereby securing the compacted storage system in a compacted state when the first fastening means is engaged with the corresponding fastening means on the rear wall of the ultimate pouch.

In any chained pouches system, a scanning and recognition means known in the art can scan labels or other identification means affixed to a pouch and effect positioning of a pouch of interest for inspection or access to its insert. Object handling means known in the art can then insert, or remove, one or more inserted objects into, or from, a pouch compartment. Functionalities of the chained pouches system include:

Display

The chained pouches system structure allows for construction of an inexpensive form of storage with a large capacity in a small volume or space and multiple display modes, and provides rapid access to the stored inserts. The functional display modes are the closed, serial-single, tipping single, sliding single, accordion, fan, parallel, paging, and reversible-double displays. The functional description that follows will use an example of an embodiment of the chained pouches system to store compact discs.

Disc Transport

Those who file compact or floppy discs will at times find it necessary to remove one or more discs from the chained pouches system for transport without transporting the entire assembly. Provision is made for the user to optionally store each disc in its own single non-chained pouch ("transport pouch") and to use the chained pouches system as a carrier for the transport pouches. A smaller chain of chained pouches can also be a transport pouch and inserted into a pouch of a chained pouch system. The use of transport pouches inserted in the chained pouches system provides a protective transportable pouch for each disk while maintaining the tipping/fan, push/pull-up/down/parallel, and serial/accordion, viewing as well as the paging features of the chained carrying pouch. Using transport pouches with transport pouch compartment dividers doubles the transport pouch's storage capacity and provides an chained pouches system accessory.

Replaceable Pages

When using a transparent pouch, sheets of material can be inserted in the pouches in front of the disks. These sheets can be used to contain useful information in a preprinted or user writable format. Further, a sheet of sufficient length can be folded in half and inserted into the pouch with half of the sheet oriented toward the front of the pouch and the other half oriented toward the back of the pouch. As in the book or notepad mode, the page orientation can be either vertical or horizontal.

Notepad

At times it is desirable for users to provide their own written information pertaining to the stored articles. The chained pouches system can be fabricated with a material chosen to provide a suitable writing surface. The chained pouches system material can be pre-printed with information prior to fabrication. This construction provides blank "pages" or partially printed pages and allows the user to use the pages as a notebook. This exterior surface of the notepad can be made of erasable, or optionally non-erasable, material chosen for various writing devices. In summary, the surfaces of the pouches can be preprinted, be erasable or non-erasable, and/or have labels that are removable or permanently affixed.

Page Orientation

In a typical book, the pages are printed on the front and back sides, then bound. In a chained pouches system used as a book, the front and back of the pouches are the printed pages. The front of a pouch becomes the first page and the back of a pouch becomes the second page. The next page (or front of the next pouch) is connected to the previous page (the rear of the preceding pouch) by the coupling portion. The printing can be oriented for use by turning the pages up or down rather than side to side (FIGS. 6A through 6C), or alternatively, oriented for use by turning the pages side to side.

Pre-printed Surface

For a chained pouches system containing printed information, it is convenient to complete the printing process prior to fabrication of the pouch. If the chain is of single piece construction the material stock is in a continuous, "stock", sheet. This stock sheet can be printed with the desired information on one side from beginning to end. In an embodiment for top to bottom page turning, the pouch is then fabricated with the top line of the printing space at the top front of the first pouch in the chain. Due to the orientation of the initial printing and the configuration of the pouch, the printing on the back of the first pouch is in the proper orientation for reading when the first pouch is flipped up. Likewise the printing space on the back of the first pouch and the front of the second pouch is continuous and in the proper orientation for reading. This entire exposed surface consisting of the back of the first pouch and the front of the second pouch (and optionally including the connecting coupling portion between them) becomes the next page of the book. In a similar fashion any page of the book can be quickly accessed by opening a closed chained pouches system.

Printed Surface—Oriented Text for Easy Paging

Alternatively the pages (the front and backs of the pouches) can be printed oriented in such a fashion that when the chained pouches system is in the collapsed position with the hinges to the left instead of to the top, paging may proceed in a fashion similar to a standard book format. The printing of the stock material could still be done in a continuous fashion but with each page printed side to side in segments to create horizontally oriented pages.

Superimposed Pages/Images

When writing on the pouch exterior, it is possible to superimpose the information on the insert. Thus the insert is protected, the information can be read as if directly on the insert, yet the information is separate and removable without touching the surface of the insert. Alternatively, the insert can be removed and, for example, inserted in another pouch. The information on the initially written upon pouch can be superimposed on another insert for comparison. This would provide an easy way for a teacher to grade student papers without writing on the original.

Smart Chain

Particularly in, but not limited to, a long chain containing possibly hundreds or thousands of inserts the automated location of a given insert is possible if the insert or a given pouch contains a unique identifier. For example the hinge portion may have a bar code label on it so that as it passed a reader in the fan portion of an endless loop, an automated reader could identify the pouch. Similarly a bar code or similar identifier could be on the insert itself, which could be read as it passed a reader. A retaining mechanism as described below would allow retention of an insert in a strictly defined position, which would be required for an efficient locating or reading mechanism. Alternatively, a magnetically encoded strip could be attached to or embedded in a chained pouches system and coded to hold positional identifying information. A magnetic strip could also be attached to or integral to the insert. Thus an identifier on the pouch or insert which is machine readable allows for an automated system wherein an operator can specify the identifier and the system can automatically locate the desired insert. The handling system could also include a means for insertion and removal of inserts, and optionally pouch mouth (or pouch compartment, where there is more than one compartment in a given pouch) sealing and unsealing, that is coordinated with the automated positioning system.

Insert Retention

Particularly, but not limited to, the jukebox mode, the pouches in a chain may have a property or mechanism to fix or hold the insert into a position once inserted into a pouch. This has the advantage of retaining the insert in the inverted position in the jukebox or looped mode. The method of holding the insert could be something such as statically charged pouch material or weak adhesive, either of which weakly adheres the front wall to the rear wall of a pouch. Similarly a magnetic material on the outside surfaces of a pouch with their attracting poles facing each other through a pouch could provide the closing, retaining force. The retention capability in a mechanized system provides an indexing or known starting position of a removed insert if the insert was originally placed in a reference position. Another mechanism to both retain an insert within a pouch and fixed in a given position would use a magnetized portion affixed or integral to the insert and a corresponding attractive magnetic portion affixed or integral to the pouch wall.

Carousel

In carousel mode, a chained pouches system is opened completely into fan mode, rotated 90 degrees clockwise or counterclockwise, and placed on a rotating platform. The length of the chain is typically such that when in fully expanded fan mode a circle of pouches is formed.

Side Opening(s) of Pouches

While all the examples so far have used a top opening of each pouch, with certain inserts it may be desirable to have side openings of the pouches. For example, with a credit card holder embodiment of the chained pouches system as part of a wallet, pouches with side rather than top openings yet connected with top hinges provides another useful optional configuration.

Closure of Individual Pouches

The pouch mouths can be sealed, e.g., permanent sealing that requires breach of the pouch to remove the insert, or resealable, e.g., using mating lips formed in the pouch material. A label can be applied across or near a sealed pouch mouth. The length of labeling material applied can be used to monitor the total length of a chained pouches system.

Multi-compartment Pouches

A pouch with two or more internal compartments can be formed by making and joining seams (e.g., by heat welding of plastic if the pouch is made of plastic) across portions of a pouch. Compartments within a pouch can be independently labeled and accessed (typically by opening a preformed access groove).

Pouch Dispenser

Pouches in a chained pouches system can be filled with an insert and distributed while chained, and then dispensed individually or in groups of pouches using vending machines or other types of dispensing apparatus. Alternatively, pouches in a system can be distributed empty, and filled with an insert at a point of dispensing. Such dispensing typically involves cutting or otherwise severing a coupling portion that results in the desired number of pouches being dispensed. For use in a public dispensing machine, pouches are typically printed or labeled for retail sale. For use in a private dispensing machine, pouches are typically printed or labeled using minimal text, barcode, or other commercially acceptable coding. For instance, a pouch can be filled with liquid, gel or food substance such as an electrolyte, energy gel, or candy bar. Use of liquid and gel contents of pouches requires watertight closure of the pouch mouth. Closure of the pouch mouth is also desirable for non-liquid or-gel contents that might degrade from exposure to the atmosphere, e.g., dried foods, sugar, salt, spices. A tear off corner on sealed pouch can be included to improve the ease of retrieval of the insert, especially for retail dispensing of pouches.

Pill Packaging and Dispensing

A chained pouches system can fabricated for use in dispensing pills, small parts, small tools, and other small, regular or irregularly shaped objects for which the number of items inserted in a pouch is very important (usually for medical or expense reasons). Such a system uses a means to fill pouches with such pills, small parts, or small tools, etc., and a pouch mouth sealer. The pouches can be "vacuum packed" (pouch compartment air withdrawn) during or after filling. Embodiments of the chained pouches system can be fabricated to dispense medications, such as pills, ointments, nutritional supplements, and IV fluids. In an embodiment for IV fluids, the pouch is sealed after filling, and a hose fitting known in the art is affixed to the pouch so that IV tubing can be easily connected to the pouch.

Materials for Chained Pouches Systems

Chained pouches systems can be made of transparent, semi-transparent, or opaque material, and are typically made of a plastic with characteristics suited to the insert weight, shape, and handling. If the material is semi-transparent, or opaque, a transparent window can be included in the pouch or coupling portion areas. Chained pouches systems can also be made of paper or other flexible material. Chained pouches systems can also be constructed with die-cut hinges, individual pouches pre-folded with the addition of hinges; pouches folded, glued and hinges applied; hinge integral or created by adhesive tape; with flexible hinge gussets, with rigid hinge gussets, with or without variable height side seams. The length of the side seam determines the amount of insert exposed about the pouch-lips, and depending on the insert, the amount desirable to expose may change. Chained pouches systems can be constructed with embedded dividers. It may be desirable with certain fragile inserts to have a permanently affixed divider between the front and back walls of a given pouch or in all the pouches in a chain. For example such a retainer made of suitable material would provide for protection from scratches during removal or insertion if compact disks were stored back to back. This enables a protected double storage in each pouch.

Exterior Pockets

One or more pockets, sealed or with an open-pocket mouth, may be applied to the outer surface of any number of the pouches, typically by heat welding of sections of the same or similar plastic material with which the main pouch is made to the front or rear wall of the main pouch (a pouch with coupling portions attached). The exterior pockets can be used to hold labels or identifiers or other objects of a flat, thin configuration that may be desirable to be filed with the pouch insert. The viewing of these external pockets would be directly using the paging mode, or the pockets could be visible through a transparent or discontinuous hinge in the fan, accordion or parallel viewing modes. Or if an insert is in an exterior pocket applied to the front surface of the first pouch, the insert need not have the flat, thin configuration. For example, a pen may be contained in an external pocket of the front pouch. Pouches made with one or more extra pockets have special utility when the interior abutting walls of the pouch compartments can be ruptured more easily than the exterior walls. One embodiment of an "extra pocketed pouch" is one with a liquid-filled, sealed main pouch and a second exterior sealed pouch that contains a second substance to be mixed with the substance in the main pouch.

Pressure applied to the exterior pocket causes rupture of a wall defect or other means in the section of the exterior pouch abutting the main pouch, which allows passage of the contents of the exterior pouch into the main pouch. The mixture is kneaded manually, and a corner of the envelope can be torn off for dispensing. This embodiment is useful for mixing adhesives and mastics, such as epoxy glues. Another embodiment enables mixing condiments to taste, e.g., ketchup in the main pouch and hot sauce in the exterior pouch, or mayonnaise in the main pouch and mustard in the exterior pouch.

Chain in Chain

The insert of a given pouch in a chain can itself be another chained pouch. This configuration allows further discrimination of articles in a stored manner within a given pouch. If the inserted chain is affixed to the interior of the holding pouch, the viewing of the inserted pouch would be limited to a parallel viewing mode. If the inserted chained pouches system is not affixed it could be removed for viewing in any of the modes. The holding chained pouches system thus becomes a carrier for the inserted chained pouch.

Variations in Pouch Size

Adjustment of the size of the pouches in a chain adapts the chained pouches system to hold, display and store a multitude of objects. The pouches could be sized to hold an 8½"×11" sheet of paper in a vertical or portrait position. All the viewing modes are still possible. Particularly useful is the flip up paging mode to read through the papers. The pouches could be sized to hold file folders on their side as in a file cabinet. This configuration becomes particularly useful in the fan position. In this way it is similar to existing expanding files currently in use. The chained pouches system is not limited to a single viewing mode as in the expandable files. The paging, accordion and parallel modes are also available.

Medical and dental x-rays are painstaking to locate among a collection of them. The chained pouches system can be sized to hold various sizes of x-ray films. The accordion, fan, paging and parallel modes are all available to find a given x-ray based on its identifying label. A further advantage, particularly using a transparent pouch, is that the x-ray film can be trans-illuminated for rapid viewing while still in its pouch. The chain of chains would be useful with x-rays to sort and store different subsets of x-rays. In a similar fashion, any flat thin transparency could be stored in a chained pouches system and be viewed by trans-illumination without being removed from its pouch. Another example includes projection transparencies. In suitably sized chained, transparent pouches, 35 mm transparencies could be stored compactly, individually in small pouches, or in groups on a carrier in larger pouches, rapidly located via their identifiers, and viewed by trans-illumination without removal from the pouch. Further variations in size of the pouches in a chain would be useful as a component in a wallet to hold and rapidly display credit cards, business cards, photographs, receipts, coupons and the like. Similarly, appropriately sized pouches could be used for storage and display of all manner of thin, flat collectibles or memorabilia. For example photographs, recipes, comic books, sports or other similar collectible cards, magazines, newspapers or their clippings, stamps, or coins in display cards benefit from the added protection, storage capacity, ease of identification and retrieval, and viewing modes provided by a chained pouch.

Labeling

Labels can be applied directly on the individual pouches as identifiers and/or for orientation of pouches for opening or other use. The labels can be preprinted, writable, or erasable. Applying the label to the pouch identifies its insert without damaging it. Identification can be color-coded, e.g., by colors on the edges of a pouch. Bar codes can be placed at various places or continuously on pouches for use in identification of pouches or pouch contents. Pouches could be labeled with Braille or other method of coding using extrusions or depressions of the pouch material or coupling portion material. The labeling can be in the reinforcement or side seam material, or directly on pouch, permanent or removable.

Reinforcement

Chained pouches systems can be constructed with reinforcement from front to back of a pouch, or a reinforcement folding over the partial or full height of side seams. Flexible reinforcement can be used in the coupling portion, for instance, in chained pouches systems in which heavy mass is inserted in pouches.

Pouch Dimensions

Chained pouches systems can be constructed with variations in the size and shape of pouches, and the material with which the pouches are constructed, to better accommodate planar inserts, such as film, transparencies, documents, music discs, video discs, memory modules, and patient records, or non-planar inserts, such as pills, small parts, or small tools.

The storage system described above is very versatile product suitable for use with a wide variety of inserts, whether planar or non-planar objects, solids or liquids, and for a wide variety of end uses, such as uses directed to improved identification, retrieval, or dispensing of stored inserts. However, all embodiments of the invention, regardless of construction or use, possess common, special technical features, i.e., (1) two or more pouches, (2) joined sequentially pouch-lip to pouch-lip by a flexible coupling portion, and (3) wherein each coupling portion flexes to permit manipulation of the joined set of pouches; "manipulation", as defined in paragraphs 10, 11, and elsewhere above, includes closing, paging, tipping/fan, accordion, parallel, push down, reverse parallel, and pull up modes of display and access of the chained pouches. These three special technical features provide unity of invention.

I claim:

1. A storage system, comprising: two or more pouches including an ultimate pouch and a penultimate pouch;

each one of the pouches adapted for holding a content and/or insert;

each pouch having a front pouch lip and a rear pouch lip forming a pouch mouth;

a flexible coupling portion joining the pouches sequentially pouch lip to pouch lip;

the flexible coupling portion including a span of flexible material extending from the rear pouch lip of a first pouch to the front pouch lip of the next pouch, in a series of pouches; said flexible coupling material portion including hinges along connections at each of the pouch lips, as well as a hinging portion in the span of the flexible coupling material portion between the pouch lips;

wherein each coupling portion flexes to permit manipulation of the joined set of pouches, said manipulation being selected from the group consisting of closing, paging, tipping, fan accordion, parallel, push down, pull up and reversible.

2. The storage system of claim 1, wherein the pouches are rectilinear and planar.

3. The storage system of claim 1, wherein the storage system is made of transparent material.

4. The storage system of claim 1, wherein seams formed by heat welding connect side and bottom margins of each pouch.

5. The storage system of claim 4, wherein the storage system is made of a continuous, uniform sheet of flexible material for holding a content.

6. The storage system of claim 1, wherein the storage system is made of a continuous, uniform sheet of flexible material, and the pouches are rectilinear and planar.

7. The storage system of claim 1, wherein the storage system is made of a continuous, uniform sheet of flexible, transparent material, and the pouches are rectilinear and planar.

8. The storage system of claim 1, wherein a means for hanging the storage system is affixed to the ultimate pouch.

9. The storage system of claim 8, wherein the means for hanging the storage system is a perforated flap of the pouch material forming the rear wall of the ultimate pouch and extending above the ultimate pouch-lip.

10. The storage system of claim 8, wherein the means for hanging the storage system is a loop affixed to the rear wall of the ultimate pouch or optionally to a flap of the pouch material forming the rear wall of the ultimate pouch and extending above the ultimate pouch-lip.

11. The storage system of claim 1, wherein the length of the flexible coupling portion joining the penultimate pouch to the ultimate pouch is elongated such that it permits the elongated coupling portion to wrap around the coupling portion side of the compacted storage system and when so wrapped to permit the ultimate pouch to abut the face of the first pouch in the storage system wherein the ultimate pouch is sized to have a longer length of pouch or flap affixed to the pouch to permit the longer ultimate length when so wrapped to enclose the bottom of to compacted storage system, and wherein a first fastening means is disposed on or near the end of the longer length to engage a corresponding fastening means positioned on the rear wall of the penultimate pouch, thereby securing the compacted storage system in a compacted state when the first fastening means is engaged with the corresponding fastening means on the rear wall of the ultimate pouch.

12. The storage system of claim 1, wherein the coupling portion is creased latitudinally and approximately mid-way between the pouch-lips it joins.

13. The storage system of claim 1, wherein the manipulation is selected from the group consisting of closing, paging, tipping/fan, accordion, parallel, push down, reverse parallel, and pull up modes.

14. The storage system of claim 1, wherein a divider is inserted one of the pouches.

15. The storage system of claim 4, wherein additional seams are formed in each pouch to join the side and/or bottom seams to form internal compartment in each pouch.

16. The storage system of claim 1, wherein one or more pouches are sized for planar records selected from the group consisting of film, transparencies, documents, music discs, video discs, memory modules, and patient records.

17. The storage system or claim 1, wherein one or more of the pouch mouths which are formed by pouch lips are sealed and a content which is selected from the group consisting of liquid gel, powder, and a substance that degrades when exposed to atmosphere in inserted in one or one more of the pouches.

18. The storage system of claim 1, wherein an exterior pocket is fabricated on one or more of the pouches.

19. The storage system of claim 1, adapted for use in retail dispensers.

20. The storage system of claim 1, adapted to dispense medications selected from the group consisting of pills, ointments, nutritional supplements, and IV fluids.

21. The storage system of claim 1, wherein the pouch mouths are sealed by seals selected from the group consisting of permanent seals and resealable seals.

22. The storage system claim 1, wherein one or more of the pouch mouths which are formed by the pouch lips are sealed by resealable seals and a content which is selected from the group consisting of liquid gel, powder, and a substance that degrades when exposed to atmosphere in inserted in one or more of the pouches.

23. The storage system of claim 1, wherein one or more one or more of the pouches have a tear-off corner.

24. The storage system of claim 1, wherein a divider is embedded or laminated in one or more of the pouches.

25. The storage system of claim 1, wherein one or more of the pouches are constructed with an exterior pocket selected from the group consisting of sealed pocket or open-mouthed pocket.

26. The storage system of claim 25, wherein an interior abutting wall shared by the exterior pocket and the pouch can be ruptured more easily than the exterior walls of the exterior pocket and of the pouch.

27. The storage system of claim 26, wherein mixing of contents of the exterior pocket and contents of the pouch is enabled by rupture of the interior abutting wall.

28. The storage system of claim 1, wherein one or more pouches are constructed of transparent material.

29. The storage system of claim 28, wherein the transparent material is suitable for trans-illumination and viewing of the pouch contents.

30. The storage system of claim 1, wherein one or more pouches are labeled.

31. The storage system of claim 30, wherein the labels are selected from the group consisting of preprinted, writable, erasable, color-coded, bar-coded, Braille, extrusion, depression, permanent, and removable.

32. The storage system of claim 1, wherein one or more pouches are constructed to conform to the size and shape of planar inserts to be stored in the pouches.

33. The storage system of claim 1, wherein one or more pouches are constructed to conform to the size and shape of non-planar inserts to be stored in the pouches.

34. The storage system of claim 1, wherein the last pouch in the storage system is adapted to be a wrap-around cover of the closed storage system.

35. The storage system of claim 1, wherein prior to assembly the material side forming the exterior of the pouches is printed with text or other visual information so that after assembly the chain is paged through sequentially.

* * * * *